United States Patent
Etter

(10) Patent No.: US 8,571,192 B2
(45) Date of Patent: Oct. 29, 2013

(54) METHOD AND APPARATUS FOR IMPROVED MATCHING OF AUDITORY SPACE TO VISUAL SPACE IN VIDEO TELECONFERENCING APPLICATIONS USING WINDOW-BASED DISPLAYS

(75) Inventor: Walter Etter, Wayside, NJ (US)

(73) Assignee: Alcatel Lucent, Paris (FR)

( * ) Notice: Subject to any disclaimer, the term of this patent is extended or adjusted under 35 U.S.C. 154(b) by 1005 days.

(21) Appl. No.: 12/459,366

(22) Filed: Jun. 30, 2009

(65) Prior Publication Data

US 2010/0328423 A1    Dec. 30, 2010

(51) Int. Cl.
*H04M 3/42*    (2006.01)

(52) U.S. Cl.
USPC ............. 379/202.01; 379/93.21; 379/158; 370/260; 455/416; 348/14.08; 348/14.16

(58) Field of Classification Search
USPC ............ 379/406, 93.21, 158, 202.01, 205.01; 348/14.08, 14.16; 345/565; 381/80; 370/401, 260–262, 271; 455/416
See application file for complete search history.

(56) References Cited

U.S. PATENT DOCUMENTS

| | | | |
|---|---|---|---|
| 5,914,728 A * | 6/1999 | Yamagishi et al. | 345/565 |
| 6,931,123 B1 * | 8/2005 | Hughes | 379/406.01 |
| 2005/0254505 A1 * | 11/2005 | Chang et al. | 370/401 |
| 2009/0296954 A1 * | 12/2009 | Hooley et al. | 381/80 |

* cited by examiner

*Primary Examiner* — Md S Elahee
(74) *Attorney, Agent, or Firm* — Harness, Dickey & Pierce

(57) ABSTRACT

A method and apparatus for enabling an improved experience by better matching of the auditory space to the visual space in video viewing applications such as those that may be used in video teleconferencing systems using window-based displays. In particular, in accordance with certain illustrative embodiments of the present invention, one or more desired sound source locations are determined based on a location of a window in a video teleconference display device (which may, for example, comprise the image of a teleconference participant within the given window), and a plurality of audio signals which accurately locate the sound sources at the desired sound source locations (based on the location of the given window in the display) are advantageously generated.

24 Claims, 14 Drawing Sheets

METHOD AND APPARATUS FOR IMPROVED MATCHING OF AUDITORY SPACE TO VISUAL SPACE IN VIDEO TELECONFERENCING APPLICATIONS USING WINDOW-BASED DISPLAYS

CROSS-REFERENCE TO RELATED APPLICATIONS

The present application is related to co-pending U.S. patent application Ser. No. 12/459,303, "Method And Apparatus For Improved Matching Of Auditory Space To Visual Space In Video Viewing Applications," filed by W. Etter on even date herewith and commonly assigned to the assignee of the present invention.

FIELD OF THE INVENTION

The present invention relates generally to the field of video teleconferencing, and more particularly to a method and apparatus for enabling an improved experience by better matching of the auditory space to the visual space when using a video teleconferencing environment which employs a window-based display.

BACKGROUND OF THE INVENTION

Video teleconferencing systems are becoming ubiquitous for both business and personal applications. And most such prior art video teleconferencing systems make use of at least two audio speakers (e.g., either loudspeakers or headphone speakers) to provide the audio (i.e., the sound) which is to be played concurrently with the associated displayed video. Moreover, there are many video teleconferencing systems which make use of a window-based display, including both "personal" (e.g., PC-based) teleconferencing systems, as well as more sophisticated commercial teleconferencing systems for business (e.g., corporate) use.

However, such prior art systems rarely succeed in (assuming that they even try) matching accurately the auditory space with the corresponding visual space. That is, in general, a prior art video teleconferencing system participant viewer who is watching a window-based video display while listening to the corresponding audio will often not hear the sound as if it were accurately emanating from the proper physical (e.g., directional) location (e.g., an apparent physical location of a human speaker visible in a given video window on the display). Even when a stereo (i.e., two or more channel) audio signal is provided, it will typically not match the appropriate corresponding visual angle, unless it happens to do so by chance. Therefore, a method and apparatus for accurately matching auditory space to visual space in video teleconferencing applications using window-based displays would be highly desirable.

SUMMARY OF THE INVENTION

The instant inventor has derived a method and apparatus for enabling an improved experience by better matching of the auditory space to the visual space in video viewing applications such as those that may be used in video teleconferencing systems using window-based displays. In particular, in accordance with certain illustrative embodiments of the present invention, one or more desired sound source locations are determined based on a location of a window in a video teleconference display device (which may, for example, comprise the image of a teleconference participant within the given window), and a plurality of audio signals which accurately locate the sound sources at the desired sound source locations (based on the location of the given window in the display) are advantageously generated. (As used herein, the terms "window," "windows" and "window-based" are intended to encompass any enclosed, typically rectangular, area on a display screen. See, e.g., www.webopedia.com/TERM/W/window.html, for a definition of "window.")

More specifically, in accordance with one illustrative embodiment of the present invention, a method is provided for generating a spatial rendering of an audio sound to a remote video teleconference participant using a plurality of speakers, the audio sound related to video being displayed to said remote video teleconference participant on a window-based video display screen having a given physical location, the method comprising receiving one or more video input signals for use in displaying said video to said remote video teleconference participant on said window-based video display screen, each of said received video input signals being displayed in a corresponding window on said video display screen; receiving one or more audio input signals related to said one or more video input signals, one of said audio input signals including said audio sound; determining a desired physical location relative to said video display screen for spatially rendering said audio sound, the desired physical location being determined based on a position on the video display screen at which a particular one of said windows is being displayed, the particular one of said windows corresponding to the received video input signal related to the received audio input signal which includes said audio sound; and generating a plurality of audio output signals based on said determined desired physical location for spatially rendering said audio sound, said plurality of audio signals being generated such that when delivered to said remote video teleconference participant using said plurality of speakers, the remote video teleconference participant hears said audio sound as being rendered from said determined desired physical location for spatially rendering said audio sound.

In addition, in accordance with another illustrative embodiment of the present invention, an apparatus is provided for generating a spatial rendering of an audio sound to a video teleconference participant, the apparatus comprising a plurality of speakers; a window-based video display screen having a given physical location, the window-based video display screen for displaying a video to the video teleconference participant, the audio sound being related to the video being displayed to said video teleconference participant; a video input signal receiver which receives one or more video input signals for use in displaying said video to said remote video teleconference participant on said window-based video display screen, each of said received video input signals being displayed in a corresponding window on said video display screen; an audio input signal receiver which receives one or more audio input signals related to said one or more video input signals, one of said received audio input signals including said audio sound; a processor which determines a desired physical location relative to said video display screen for spatially rendering said audio sound, the desired physical location being determined based on a position on the video display screen at which a particular one of said windows is being displayed, the particular one of said windows corresponding to the received video input signal related to the received audio input signal which includes said audio sound; and an audio output signal generator which generates a plurality of audio output signals based on said determined desired physical location for spatially rendering said audio sound, said plurality of audio signals being generated such that when delivered to said remote video teleconference participant using said plurality of speakers, the remote video teleconference participant hears said audio sound as being rendered from said determined desired physical location for spatially rendering said audio sound.

DETAILED DESCRIPTION OF THE PREFERRED EMBODIMENTS

Introduction

Co-pending U.S. patent application Ser. No. 12/459,303, "Method And Apparatus For Improved Matching Of Auditory Space To Visual Space In Video Viewing Applications," filed by W. Etter on even date herewith and commonly assigned to the assignee of the present invention (hereinafter "the co-pending Etter application"), describes in detail both prior art methods for rendering audio in video viewing applications such as video teleconferencing systems, as well as a novel method and apparatus for enabling an improved experience by better matching of the auditory space to the visual space in video viewing applications. For the purpose of completeness of this disclosure, much of the specification of the co-pending Etter application—specifically, the "Detailed Description of the Preferred Embodiments" section thereof, which includes, in particular, all of its figures (i.e., FIGS. 1-10 thereof, which have been repeated herein as corresponding FIGS. 1-10 hereof) and the associated descriptions thereof—have been repeated herein.

Disclosure from the Co-Pending Etter Application

Figure 1:
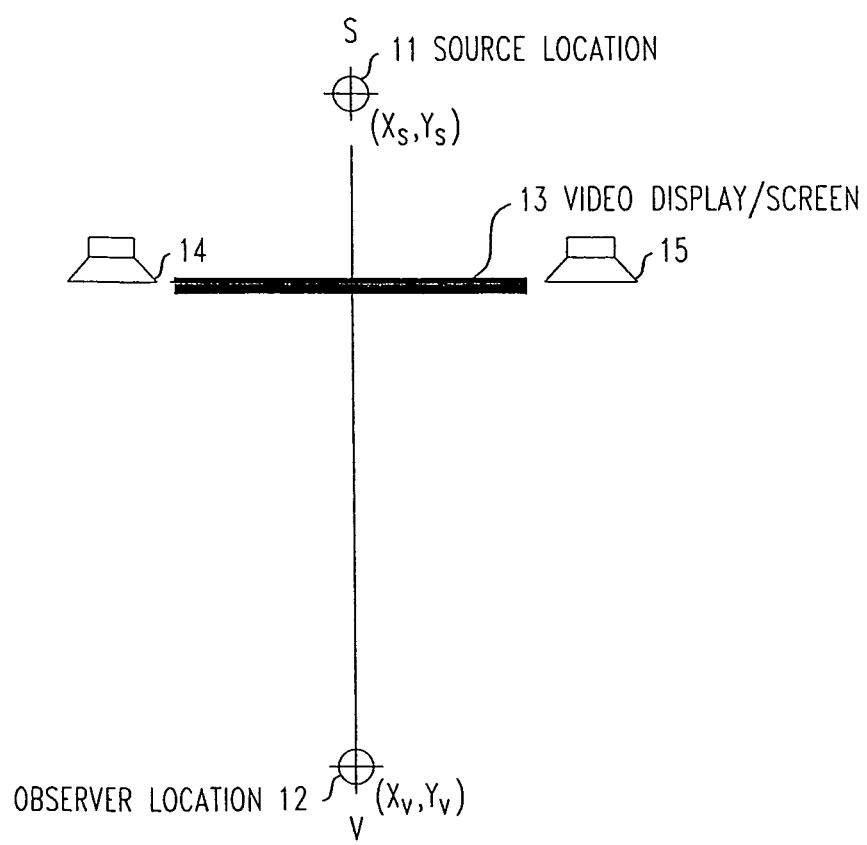
FIG. 1 shows a prior art environment for providing monaural audio rendering of a sound source in a video teleconferencing application.

FIG. 1 shows a prior art environment for providing monaural audio rendering of a sound source in a video teleconferencing application. Such an environment is probably the most common setup in today's PC-based teleconferencing systems. Although two speakers are commonly used—left speaker 14 located on the left side of the monitor (i.e., video display screen 13), and right speaker 15 located on the right side of the monitor (i.e., video display screen 13)—the audio signal is commonly a monaural signal—that is, both left and right loudspeakers receive the same signal. As a result, the audio appears to observer 12 (shown as being located at position $x_v$, $y_v$) to be emanating from audio source location 11 (shown as being located at position $x_s$, $y_s$), which is merely a "phantom" source which happens to be located in the middle of the two speakers. Although the monitor may be showing multiple conference participants in different visual positions, or a video (e.g., a movie) comprising human speakers located at various positions on the screen, each of their auditory positions appear to be in the same location—namely, right in the middle of the monitor. Since the human ear is typically able to distinguish auditory angle differences of about 1 degree, such a setup produces a clear conflict between visual and auditory space. In addition, the monaural reproduction reduces intelligibility, particularly in a videoconferencing environment when multiple people try to speak at the same time, or when an additional noise source disturbs the audio signal.

Figure 2:
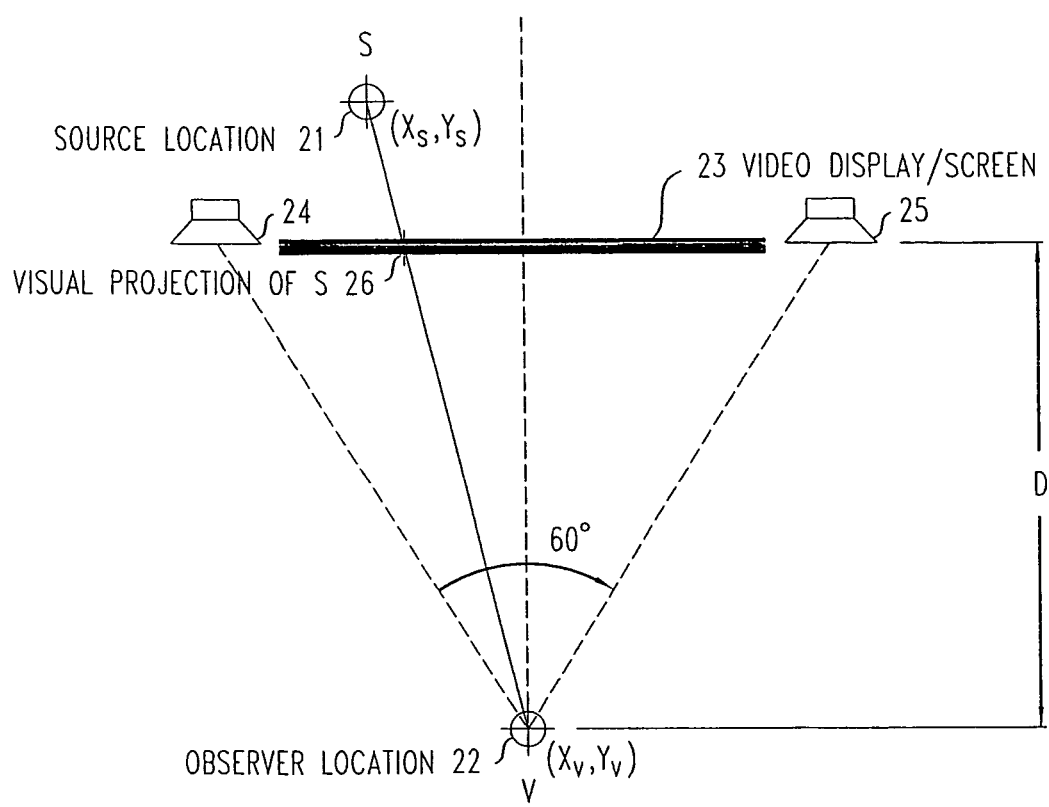
FIG. 2 shows a prior art environment for providing stereo audio rendering of a sound source in a video teleconferencing application.

FIG. 2 shows a prior art environment for providing stereo audio rendering of a sound source in a video teleconferencing or video (e.g., movie) viewing application. In this environment, observer 22 (shown as being located at position $x_v$, $y_v$) and the pair of loudspeakers—left speaker 24 located on the left side of the monitor (i.e., video display screen 23), and right speaker 25 located on the right side of the monitor (i.e., video display screen 23)—typically span a roughly equilateral triangle. That is, the angle between the two speakers and the listener (i.e., the observer) is approximately 60 degrees.

Furthermore, in such a stereo rendering environment, the loudspeakers now receive different signals, which are typically generated by panning the audio sources to the desired positions within the stereo basis. Specifically, this "fixed" environment may, in fact, be specifically set up such that both visual and auditory spaces do match. Namely, if the individual loudspeaker signals are properly generated, then, when a speaker is visually projected on video display screen 23 at, for example, screen location 26 thereof, the audio source location of the speaker may, in fact, appear to observer 22 as being located at source location 21 (shown as being located at position $x_s$, $y_s$), which properly corresponds to the visual location thereof (i.e., visual projection screen location 26 on video display screen 23). However, the "proper" operation of this setup (wherein the visual and auditory spaces do match) necessarily requires that observer 22 is, in fact, located at the precise "sweet spot"—namely, as shown in the figure at position $x_v$, $y_v$, which is, as pointed out above, typically precalculated to be at an approximately 60 degree angle from the two speakers. If, on the other hand, the observer changes the distance "D" to the screen, or otherwise moves his or her physical location (e.g., moves sideways), the visual and auditory spaces will clearly no longer match.

Figure 3:
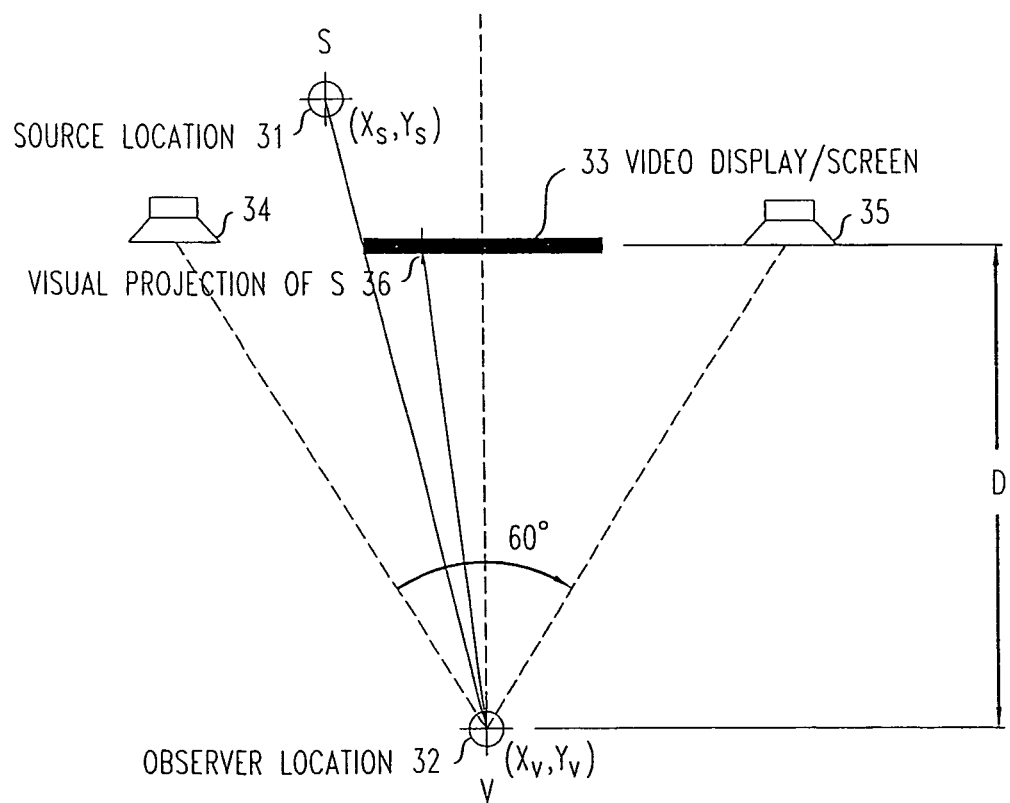
FIG. 3 shows a prior art environment for providing stereo audio rendering of a sound source in a video teleconferencing application but which uses a smaller monitor/screen size as compared to the prior art environment of FIG. 2.

Moreover, if the monitor size is changed, for example, the visual and auditory spaces will also no longer match. FIG. 3 shows the prior art environment for providing stereo audio rendering of a sound source in a video teleconferencing application which uses a smaller monitor/screen size as compared to the prior art environment of FIG. 2. Specifically, the figure shows observer 32 (shown as being located at position $x_v$, $y_v$) and the pair of loudspeakers—left speaker 34 located on the left side of the monitor (i.e., video display screen 33), and right speaker 35 located on the right side of the monitor (i.e., video display screen 33)—such that, as in the case of the environment of FIG. 2, they span an equilateral triangle. That is, the angle between the two speakers and the listener (i.e., the observer) remains at 60 degrees. Also, as in the environment of FIG. 2, the loudspeakers receive the same (different) individual audio signals as they were assumed to receive in the case of FIG. 2, which have been generated by the same panning of the audio sources to the desired positions within the stereo basis.

However, since the angle from observer 32 to the visual projection of the (same) speaker on video display screen 33 at location 36 thereof differs from the corresponding angle in the setup of FIG. 2, the audio source location of the speaker will now, in fact, appear to observer 32 as being located at source location 31 (shown as being located at position $x_s$, $y_s$), which no longer properly corresponds to the visual location thereof (i.e., visual projection screen location 36 on video display screen 33). That is, even when observer 32 maintains the 60 degree angle to the loudspeakers and the distance "D" from the screen, the visual and auditory spaces will no longer match—rather, it would now be required that the sound sources are panned to different angles to match the auditory space to the visual space, based on the changed video display size.

Other approaches that have been employed include (a) binaural audio rendering and (b) sound field synthesis techniques. In binaural audio rendering, which is fully familiar to those of ordinary skill in the art, two audio signals are produced, one for the left ear and one for the right ear. Binaural audio can therefore be easily directly reproduced with headphones. When played over a pair of loudspeakers, however, the binaural signals need to be processed by a cross-talk canceller to preprocess each of the loudspeaker signals such that the cross-talk from the right loudspeaker to the left ear and vice-versa properly cancels out at the listener's individual ears. Such techniques are well known and familiar to those of ordinary skill in the art. Moreover, added realism for binaural rendering for headphones may be achieved when head-tracking is used to assist the rendering process. In particular, such system may advantageously adjust the synthesized binaural signal such that the location of a sound source does not inappropriately turn along with the head of the listener, but rather stays fixed in space regardless of the rotational head movement of the listener. For example, one prominent application of this technique is in the rendering of "3/2 stereo" (such as Dolby 5.1®) over headphones. In such a case, the five individual loudspeaker signals are mixed down to a binaural signal accounting for the standardized positional angles of the loudspeakers. For example, the front-left speaker positioned at 30 degree to the left of the listener may be advantageously convolved with the head-related impulse response corresponding to a 30 degrees sound arrival incident.

Unfortunately, such systems are limited to the compensation of horizontal head-rotation—other head movements, such as forward-backward and left-right movements, are not appropriately compensated for. In PC-based teleconferencing applications, for example, where the participant's distance to the video display (e.g., the monitor) is usually much closer than it is in typical movie playback systems, a sideward head movement may, for example, be as large as the size of the monitor itself. As such, a failure to compensate for such movements (among others) significantly impairs the ability of the system to maintain the correct directional arrival of the sound. Furthermore, the generation of binaural signals is commonly based on the assumption that the listener's position is fixed (except for his or her rotational head movement), and therefore cannot, for example, allow the listener to move physically around and experience the changes of arrival directions of sound sources—for example, such systems do not allow a listener to walk around a sound source. In other words, prior-art methods of binaural audio take movements of sound sources into account, as well as rotation of a listener's head, but they do not provide a method to take a listener's body movements into account.

More specifically, generating binaural signals is commonly based on sound arrival angles, whereby distance to the sound source is typically modeled by sound level, ratio of direct sound to reflected/reverberated sound, and frequency response changes. Such processing may be sufficient as long as either (a) the listener only moves his head (pitch, jaw, role), but does not move his entire body to another location, or (b) the sound source is significantly distant from the listener such that lateral body movements are much smaller in size compared to the distance from the listener to the sound source. For example, when binaural room impulse responses are used to reproduce with headphones the listening experience of a loudspeaker set in a room at a particular listener position, some minimal lateral body movement of the listener will be acceptable, as long as such movement is substantially smaller than the distance to the reproduced sound source (which, for stereo, is typically farther away than the loudspeakers themselves). On the other hand, for a PC-based audiovisual telecommunication setup, for example, lateral movements of the listener can no longer be neglected, since they may be of a similar magnitude to the distance between the listener and the sound source.

Sound field synthesis techniques, on the other hand, include "Wavefield Synthesis" and "Ambisonics," each of which is also familiar to those skilled in the art. Wavefield synthesis (WFS) is a 3D audio rendering technique which has the desirable property that a specific source location may be defined, expressed, for example, by both its depth behind or in front of screen, as well as its lateral position. When 3D video is presented with WFS, for example, the visual space and the auditory space match over a fairly wide area. However, when 2D video is presented with WFS rendered audio, the visual space and auditory space typically match only in a small area in and around the center position.

Ambisonics is another sound field synthesis technique. A first-order Ambisonics system, for example, represents the sound field at a location in space by the sound pressure and by a three dimensional velocity vector. In particular, sound recording is performed using four coincident microphones—an omnidirectional microphone for sound pressure, and three "figure-of-eight" microphones for the corresponding velocity in each of the x, y, and z directions. Recent studies have shown that higher order Ambisonics techniques are closely related to WFS techniques.

Figure 4:
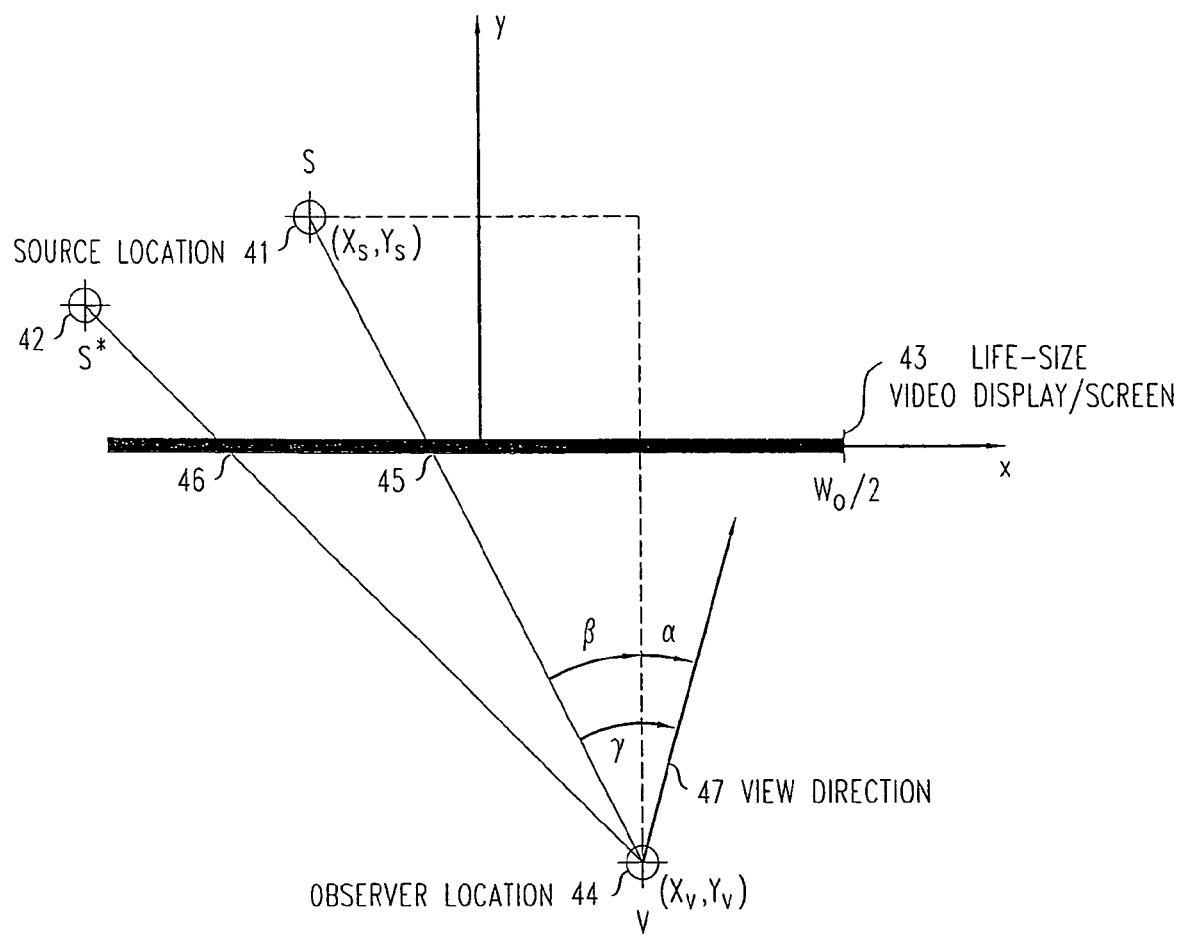
FIG. 4 shows an illustrative environment for providing true-to-life size audio-visual rendering of a sound source in a video teleconferencing application, in accordance with a first illustrative embodiment of the present invention.

FIG. 4 shows an illustrative environment for providing true-to-life size audio-visual rendering of a sound source in a video teleconferencing application, in accordance with a first illustrative embodiment of the present invention. Specifically, the figure shows an illustrative scenario for true-to-life size audio-visual rendering of sound source location 41 (S), which may, for example, be from a person shown on video display 43 at screen position 45 who is currently speaking, where the sound source is to be properly located at position $(x_s, y_s)$, and where observer 44 (i.e., listener V) is physically located at position $(x_v, y_v)$. For simplicity, FIG. 4 only shows the horizontal plane. However, it will be obvious to those of ordinary skill in the art that the same principles as described herein may be easily applied to the vertical plane. Note also that video display 43 may be a 3D (three dimensional) display or it may be 2D (two dimensional) display.

The center of the coordinate system may be advantageously chosen to coincide with the center of true-to-life size video display 43. As is shown in the figure, sound source location 41 (S) is laterally displaced from the center of the screen by $x_s$ and the appropriate depth of the source is $y_s$. Likewise, observer 44 (V) is laterally displaced from the center of the screen by $x_v$ and the distance of observer 44 (V) from the screen is $y_v$. FIG. 4 further indicates that the observer's head position—that is, viewing direction 47—is turned to the right by angle α.

In accordance with the principles of the present invention, we can advantageously correctly render binaural sound for observer 44 (V) by advantageously determining the sound arrival angle:

$$\gamma = \alpha + \beta,$$

where β can be advantageously determined as follows:

$$\beta = \arctan \frac{x_V - x_S}{y_V - y_S}.$$

Once γ has been advantageously determined, it will be obvious to those of those of ordinary skill in the art, that based on prior art binaural audio techniques, a proper binaural audio-visual rendering of sound source S may be performed in accordance with the first illustrative embodiment of the present invention. In a similar manner, a proper binaural audio-visual rendering of sound source location 42 (S*), which may for example, be from a person shown on video display 43 at screen position 46 who is currently speaking, may also be performed in accordance with this illustrative embodiment of the present invention.

Figure 5:
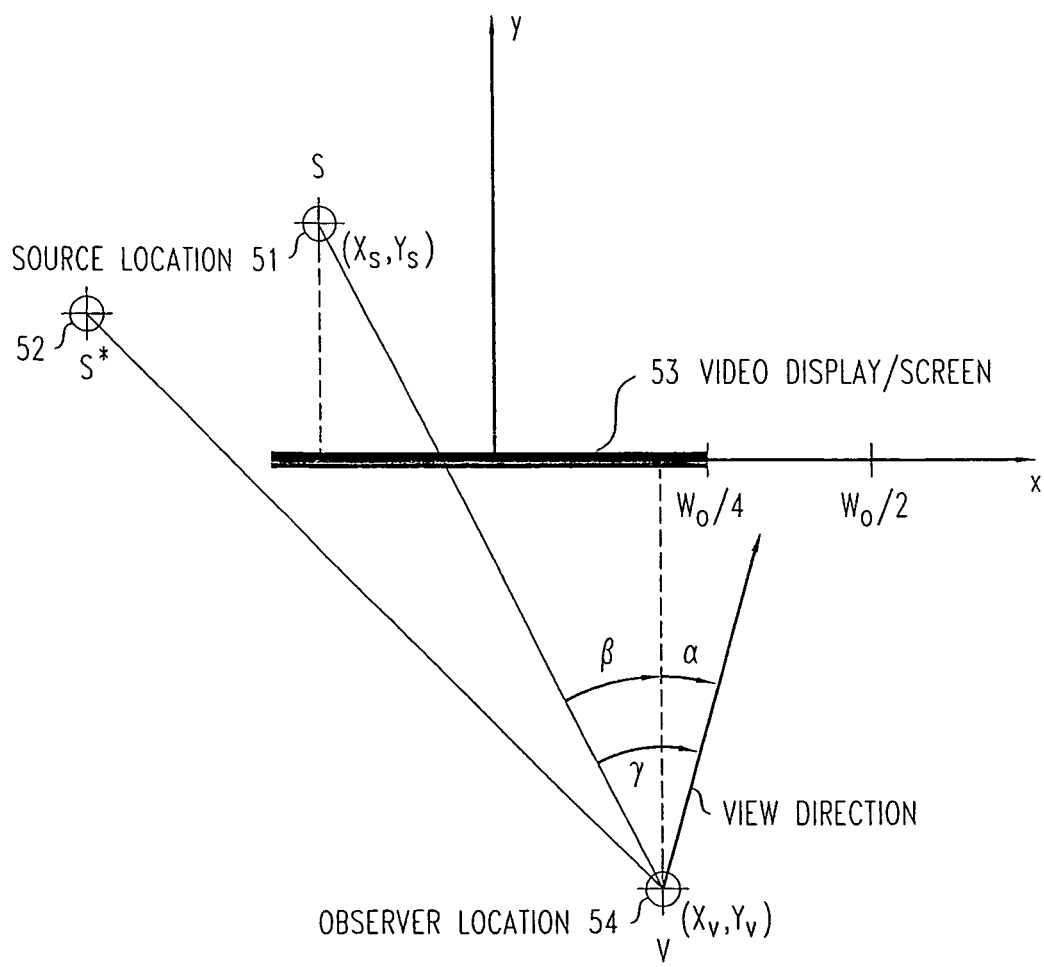
FIG. 5 shows the effect on the illustrative environment for providing audio-visual rendering of a sound source in a video teleconferencing application as shown in FIG. 4, when a smaller monitor/screen size is used.

If the video display differs from true-to-life size, however, the use of angle γ as determined in accordance with the illustrative embodiment of FIG. 4 may result in inaccurate audio rendering. In particular, FIG. 5 shows the effect on the illustrative environment for providing audio-visual rendering of a sound source in a video teleconferencing application as shown in FIG. 4, when a smaller monitor/screen size is used, but where no adjustment is made to the audio rendering (as determined in accordance with the above description with reference to FIG. 4). Specifically, FIG. 5 shows sound source locations 51 (S) and 52 (S*), along with video display 53, which is illustratively smaller than a true-to-life size screen (such as, for example, the one illustratively shown in FIG. 4).

Note that only the auditory locations of sound source locations 51 (S) and 52 (S*) are shown in the figure, without their corresponding visual locations being shown. (The actual visual locations will, for example, differ for 2D and 3D displays.) Note also that the person creating sound at sound source location 52 (S*) will, in fact, visually appear to observer 54 on the screen of video display 53, even though, assuming that angle γ is used as described above with reference to FIG. 4, the sound source itself will arrive from outside the visual area. This will disadvantageously produce an apparent mismatch between the visual and auditory space. Similarly, the sound source S will also be mismatched from the corresponding visual representation of the speaker.

Figure 6:
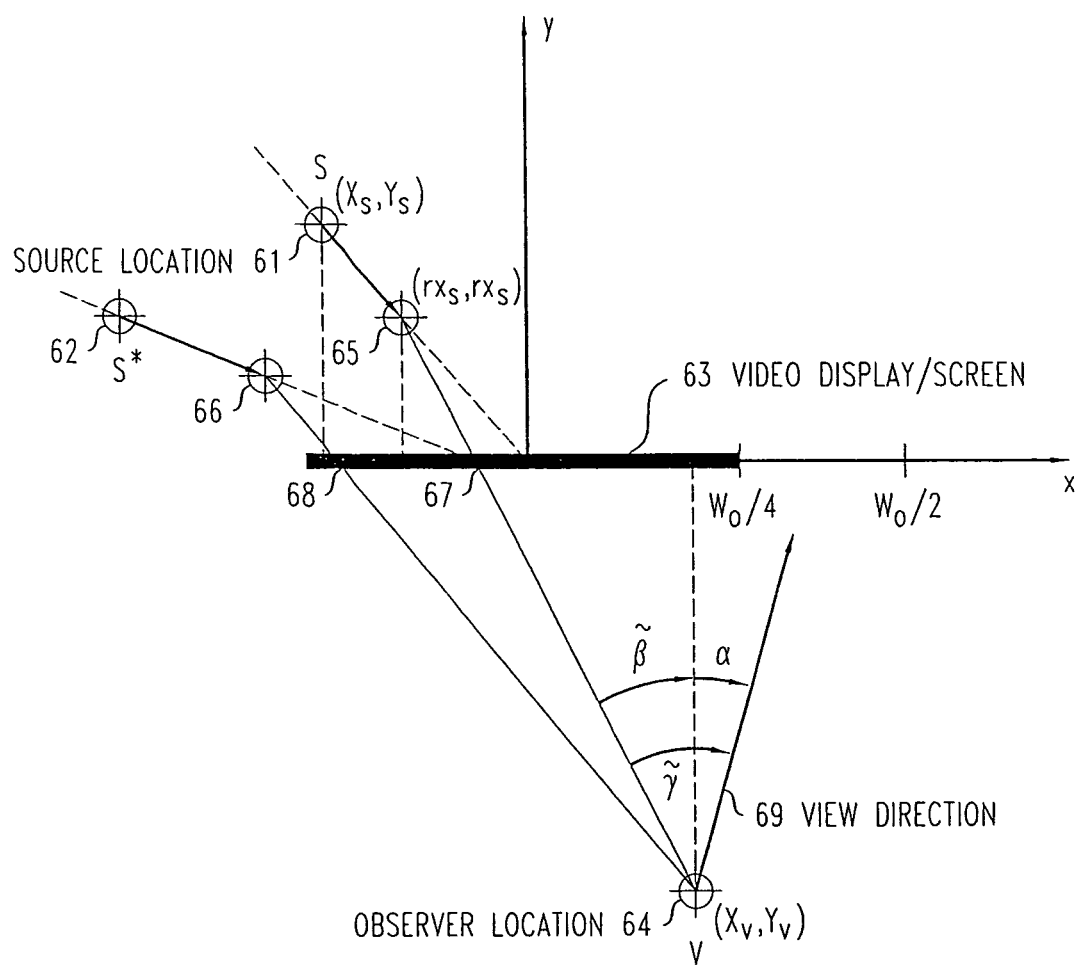
FIG. 6 shows an illustrative environment for providing audio-visual rendering of a sound source in a video teleconferencing application which provides screen-centered scaling for auditory space, in accordance with a second illustrative embodiment of the present invention.

FIG. 6 shows an illustrative environment for providing audio-visual rendering of a sound source in a video teleconferencing application which provides screen-centered scaling for auditory space, in accordance with a second illustrative embodiment of the present invention. In particular, the illustrative embodiment of the present invention shown in FIG. 6 may advantageously be used with screen sizes that are not true-to-life size (e.g., smaller), as is typical. Again, the display may be a 3D (three dimensional) display or it may be 2D (two dimensional) display.

Specifically, in accordance with this illustrative embodiment of the present invention, the proper correspondence between the auditory rendering and the non-true-to-life visual rendering is addressed by advantageously scaling the spatial properties of the audio proportionally to the video. In particular, a scaling factor r is determined as follows:

$$r = \frac{W}{W_0},$$

where $W_0$ denotes the screen width which would be required for true-to-life size visual rendering (e.g., the screen width of video display 43 shown in FIG. 4) and where W denotes the (actual) screen width of video display 63 as shown in FIG. 6. Given scaling factor r, the coordinates of the source location may be advantageously scaled to derive an equation for an angle $\tilde{\gamma}$ as follows:

$$\tilde{\gamma} = \alpha + \tilde{\beta},$$

where $$\tilde{\beta} = \arctan \frac{x_V - r \cdot x_S}{y_V - r \cdot y_S}.$$

Specifically, FIG. 6 shows originally located sound source location 61 (S), which may, for example, be a person shown on video display 63 at screen position 67 who is currently speaking, where the sound source would, in accordance with the determination of angle γ as shown above in connection with FIG. 4, be improperly located at position $(x_s, y_s)$. However, properly relocated sound source location 65 should (and will, in accordance with the illustrative embodiment of the invention shown in connection with this FIG. 6) be advantageously located at position $(rx_s, ry_s)$ instead. Note that observer 64 (i.e., listener V) is physically located at position $(x_v, y_v)$. Similarly, originally located sound source location 62 (S*), which may, for example, be a person shown on video display 63 at screen position 68 who is currently speaking, should (and will, in accordance with the illustrative embodiment of the invention shown in connection with this FIG. 6) be advantageously located at properly relocated sound source location 66. Again, for simplicity, FIG. 6 only shows the horizontal plane. However, it will be obvious to those of ordinary skill in the art that the same principles as described herein may be easily applied to the vertical plane. Note also that video display 63 may be a 3D (three dimensional) display or it may be 2D (two dimensional) display.

The center of the coordinate system again may be advantageously chosen to coincide with the center of (reduced size) video display 63. As is shown in the figure, sound source location 61 (S) is laterally displaced from the center of the screen by $x_s$ and the depth of the source is $y_s$. Likewise, observer 64 (V) is laterally displaced from the center of the screen by $x_v$ and the distance of observer 44 (V) from the screen is $y_v$. FIG. 6 further indicates that the observer's head position—that is, viewing direction 69—is turned to the right by angle α.

Therefore, in accordance with the principles of the present invention, and further in accordance with the illustrative embodiment shown in FIG. 6, we can advantageously correctly render binaural sound for observer 64 (V) by advantageously determining the sound arrival angle γ as determined above. In view of the geometrical interpretation of this illustrative scaling procedure, it has been referred to herein as screen-centered scaling. Note that as the size of a video display is changed, the video itself is always scaled in this same manner—both for 2D and 3D video display implementations.

Figure 7:
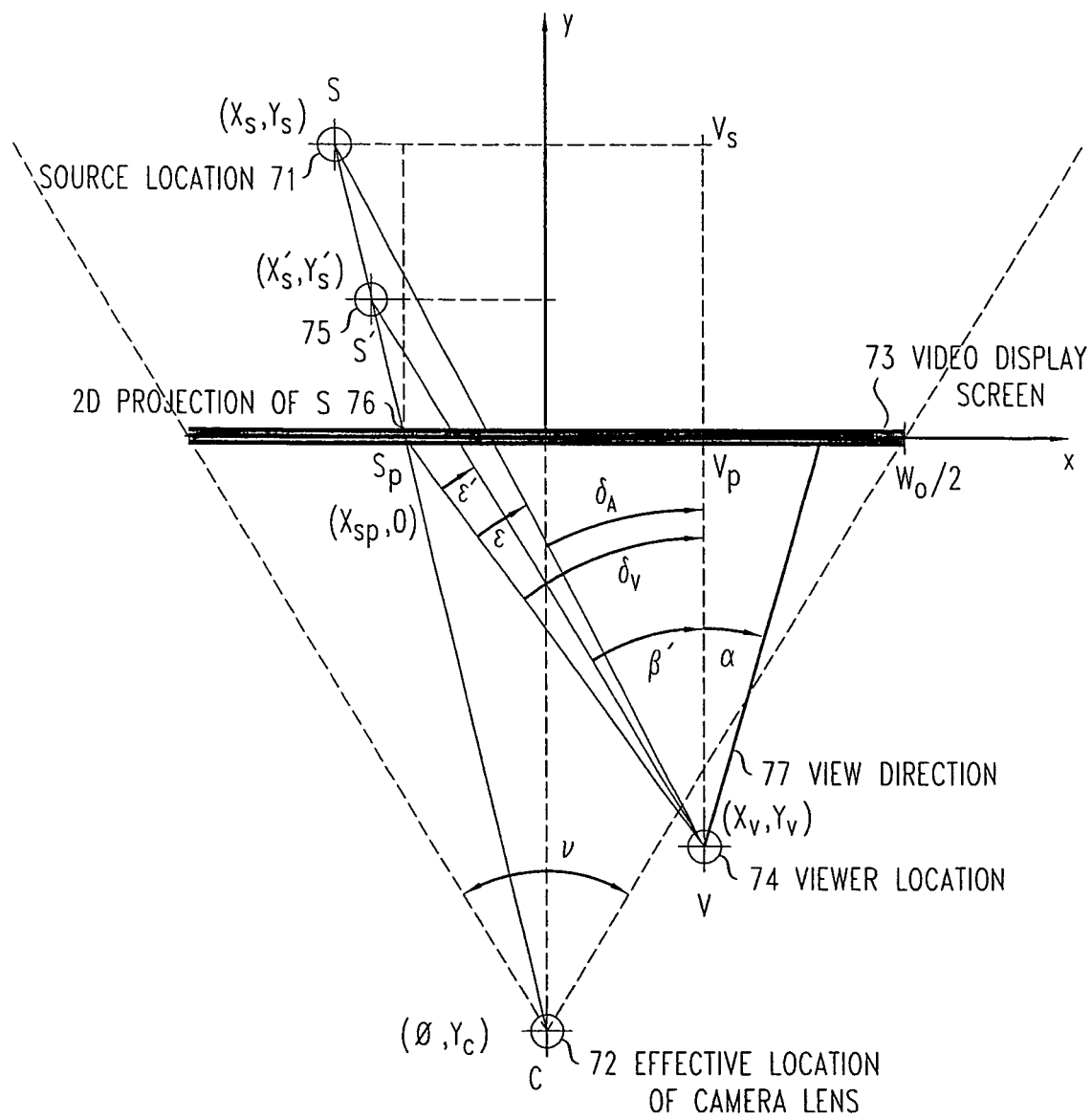
FIG. 7 shows an illustrative environment for providing audio-visual rendering of a sound source in a video teleconferencing application which provides camera-lens-centered scaling, in accordance with a third illustrative embodiment of the present invention.

FIG. 7 shows an illustrative environment for providing audio-visual rendering of a sound source in a video teleconferencing application which provides camera-lens-centered scaling, in accordance with a third illustrative embodiment of the present invention. In accordance with this illustrative embodiment of the present invention, which may be advantageously employed with use of a 2D video projection, we advantageously scale the sound source location such that it moves on a line between:

(a) originally located sound source 71 (S), which may, for example, be a person shown on video display screen 73 who is currently speaking and whose projection point 76 ($S_p$) is located on the display screen at position $(x_{sp}, 0)$, and (b) the "effective" location of the video camera lens—location 72 (C)—which captured (or is currently capturing) the video being displayed on video display 73—specifically, C is shown in the figure as located at position $(0, y_c)$, even though it is, in fact, probably not actually located in the same physical place as viewer 74. In particular, the value $y_c$ represents the effective distance of the camera which captured (or is currently capturing) the video being displayed on the display screen.

Specifically, then, in accordance with this third illustrative embodiment of the present invention, we advantageously relocate the sound source to scaled sound source 75 (S'), which is to be advantageously located at position $(x_s', y_s')$. To do so, we advantageously derive the value of angle β' as follows:

First, we note that given the coordinate $x_{sp}$ of the projection point 76 ($S_p$), and based on the similar triangles in the figure, we find that $$\frac{x_S}{y_S - y_C} = \frac{x_{SP}}{-y_C}$$

and, therefore, that $$x_{SP} = \frac{y_C}{y_C - y_S} \cdot x_S.$$

Then, we can advantageously determine the coordinates $(x_s', x_s')$ of the scaled sound source 75. For this purpose, we advantageously introduce a scaling factor $0 \leq \rho \leq 1$ to determine how the sound source is to be advantageously scaled along the line spanned by the two points S (original sound location 71) and $S_p$ (projection point 76). For ρ=1, for example, the originally located sound source 71 (S) would not be scaled at all—that is, scaled sound source 75 (S') would coincide with originally located sound source 71 (S). For ρ=0, on the other hand, the originally located sound source 71 (S) would be scaled maximally—that is, scaled sound source 75 (S') would coincide with projection point 76 ($S_p$). Given such a definition of the scaling factor ρ, we advantageously obtain:

$x_s' = x_{SP} + \rho(x_S - x_{SP})$; or $x_x' = x_{SP} \cdot (1-\rho) + \rho \cdot x_S$ and using the above derivation of $x_{sp}$, we advantageously obtain:

$$x_S' = \frac{y_C}{y_C - y_S} \cdot x_S \cdot (1-\rho) + \rho \cdot x_S;$$

or $$x_S' = \left(\frac{y_C \cdot (1-\rho)}{y_C - y_S} + \rho\right) \cdot x_S;$$

or $$x_S' = \left(\frac{y_C \cdot (1-\rho) + \rho(y_C - y_S)}{y_C - y_S}\right) \cdot x_S = \left(\frac{y_C - \rho \cdot y_S}{y_C - y_S}\right) \cdot x_S$$

and $$y_S' = \rho \cdot y_S.$$

Using the coordinates $(x_s', y_s')$ of scaled sound source 75 (S'), we can then advantageously determine the value of angle β' as follows:

$$\beta' = \arctan\left(\frac{x_V - x_S'}{y_V - y_S'}\right);$$

or $$\beta' = \arctan\left(\frac{x_V - \left(\frac{y_C - \rho \cdot y_S}{y_C - y_S}\right) \cdot x_S}{y_V - \rho \cdot y_S}\right)$$

Note that in response to a change in the display size, we may advantageously scale the coordinates of $(x_S, y_S)$ and $(x_C, y_C)$ in a similar manner to that described and shown in FIG. 6 above, thereby maintaining the location coordinates $(x_V, y_V)$ of observer 74 (V). Note that, as shown in the figure, video display 73 is illustratively of true-to-life size $W_0$ (as in FIG. 4 above). Specifically, then, using the scaling factor r (illustratively, r=1 in FIG. 7) as defined in connection with the description of FIG. 6 above, $$\beta' = \arctan\left(\frac{x_V - \left(\frac{r \cdot y_C - \rho \cdot r \cdot y_S}{r \cdot y_C - r \cdot y_S}\right) \cdot r \cdot x_S}{y_V - \rho \cdot r \cdot y_S}\right);$$

or $$\beta' = \arctan\left(\frac{x_V - \left(\frac{y_C - \rho \cdot y_S}{y_C - y_S}\right) \cdot r \cdot x_S}{y_V - \rho \cdot r \cdot y_S}\right)$$

Finally, taking into account the fact that the observer's head position—that is, viewing direction 75—is turned to the right by angle α, we can advantageously compute the sum of α and β' to advantageously render accurate binaural sound for observer 74 (V) by advantageously determining the (total) sound arrival angle α+β'.

Note that an appropriate scaling factor ρ may be advantageously derived from a desired maximum tolerable visual and auditory source angle mismatch. As shown in FIG. 7, the video shown on video display 73 has been (or is being) advantageously captured (elsewhere) with a video camera located at a relative position $(0, y_c)$ and a camera's angle of view v. The auditory and visual angles will advantageously match naturally only if viewer 74 is located (exactly) at position $(0, y_c)$. Any other location for viewer 74 will result in a mismatch of auditory and visual angle indicated by ε as shown in FIG. 7. Therefore, using the two triangles $VS_pV_p$ and $VSV_s$, we can advantageously derive the angle mismatch $$\varepsilon = \delta_V - \delta_A = \arctan\frac{x_V - x_{SP}}{y_V} - \arctan\frac{x_V - x_S}{y_V - y_S}$$

From this equation, or directly from FIG. 7, it is apparent that the mismatch angle depends on three locations: (a) the source location, S, (b) the viewer location, V, and (c) the effective camera lens location, C (via $x_{SP}$). To limit the angle mismatch ε in accordance with one embodiment of the present invention, these three locations may be constrained. However, in accordance with another illustrative embodiment of the present invention, the positions of these three locations that lead to the largest angle mismatch may be advantageously determined, and based on the determined largest angle mismatch, an appropriate scaling factor can be advantageously determined such that the resultant angle mismatch will always be within a pre-defined acceptable maximum, based on perception—illustratively, for example, 10 degrees. For example, the scaled source location may be derived as shown in FIG. 7 so as to result in an angle mismatch of ε'.

Note that from the camera's view angle (v as shown in FIG. 7) and the size of the display screen (illustratively shown in FIG. 7 to be true-to-life size—namely, $W_0$), the camera distance $y_c$ can be easily derived in accordance with one illustrative embodiment of the present invention. Source locations can determined in a number of ways, in accordance with various illustrative embodiments of the present invention. For example, they may be advantageously derived from an analysis of the video itself, they may be advantageously derived from the audio signal data, or they may be advantageously generated spontaneously as desired. In addition, the source locations and/or the camera view angle may be advantageously transmitted to an illustrative system in accordance with various illustrative embodiments of the present invention as meta-data.

Figure 8:
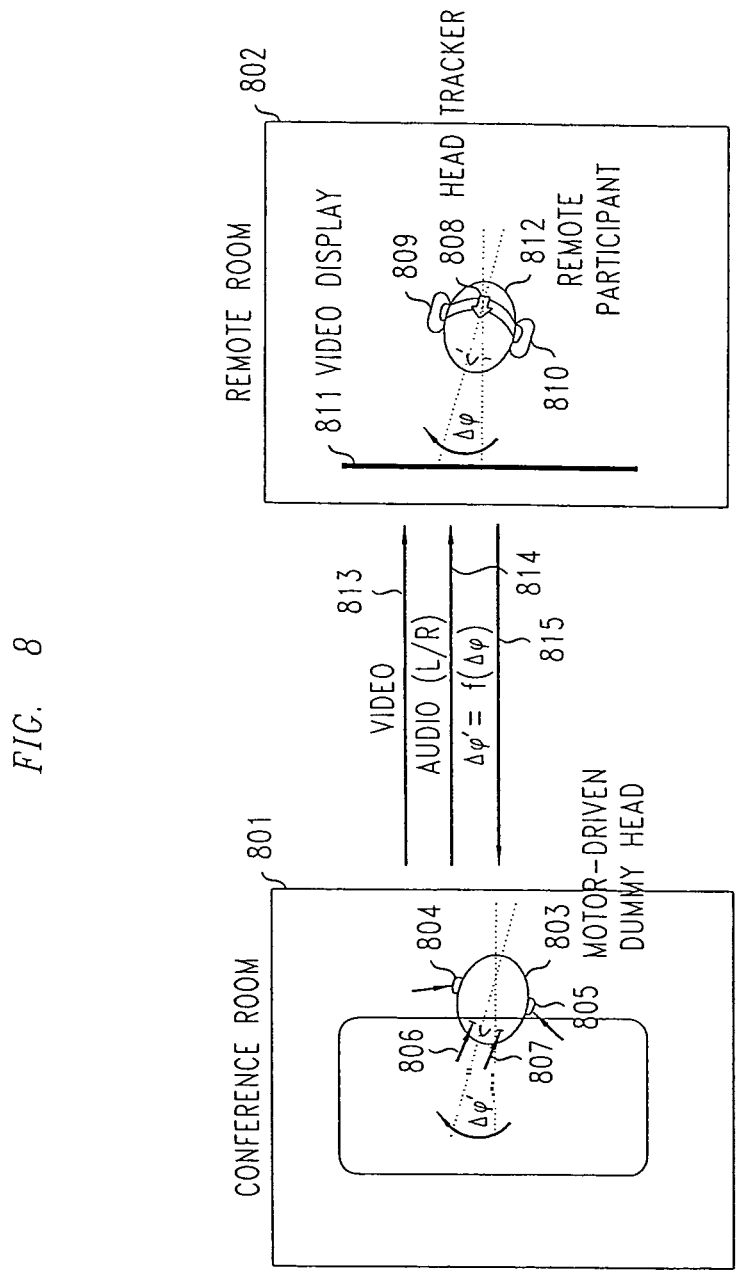
FIG. 8 shows an illustrative environment for providing binaural audio-visual rendering of a sound source in a video teleconferencing application using a video display screen and a dummy head in the subject conference room, in accordance with a fourth illustrative embodiment of the present invention.

FIG. 8 shows an illustrative environment for providing binaural audio-visual rendering of a sound source in a video teleconferencing application using a video display screen and a dummy head in the subject conference room, in accordance with a fourth illustrative embodiment of the present invention. The figure shows two rooms—conference room 801 and remote room 802. Remote room 802 contains remote participant 812 who is viewing the activity (e.g., a set of conference participants) in conference room 801 using video display screen 811 and listening to the activity (e.g., one or more speaking conference participants) in conference room 801 using a headset comprising right speaker 809 and left speaker 810. The headset also advantageously comprises head tracker 808 for determining the positioning of the head of remote participant 812. (In accordance with alternative embodiments of the present invention, head tracker 808 may be independent of the headset, and may be connected to the person's head or alternatively may comprise an external device—i.e., one not connected to remote participant 812. Moreover, in accordance with other illustrative embodiments of the present invention, the headset containing speakers 809 and 810 may be replaced by a corresponding pair of loudspeakers positioned appropriately in remote room 802, in which case adaptive crosstalk cancellation may be advantageously employed to reduce or eliminate crosstalk between each of the loudspeakers and the non-corresponding ears of remote participant 812—see discussion of FIG. 10 below.)

Conference room 801 contains motor-driven dummy head 803, a motorized device which takes the place of a human head and moves in response to commands provided thereto. Such dummy heads are fully familiar to those skilled in the art. Dummy head 803 comprises right in-ear microphone 804, left in-ear microphone 805, right in-eye camera 806, and left in-eye camera 807. Microphones 804 and 805 advantageously capture the sound which is produced in conference room 801, and cameras 806 and 807 advantageously capture the video (which may be produced in stereo vision) from conference room 801—both based on the particular orientation (view angle) of dummy head 803.

In accordance with the principles of the present invention, and in accordance with the fourth illustrative embodiment thereof, the head movements of remote participant 812 are tracked with head tracker 808, and the resultant head movement data is transmitted by link 815 from remote room 802 to conference room 801. There, this head movement data is provided to dummy head 803 which properly mimics the head movements of remote participant 812 in accordance with an appropriate angle conversion function f(Δφ) as shown on link 815. (The function "f" will depend on the location of the dummy head in conference room 801, and will be easily ascertainable by one of ordinary skill in the art. Illustratively, the function "f" may simply be the identity function, i.e., f(Δφ)=Δφ, or it may simply scale the angle, i.e., f(Δφ)=qΔφ, where q is a fraction.) Moreover, the video captured in conference room 801 by cameras 806 and 807 is transmitted by link 813 back to remote room 802 for display on video display screen 811, and the binaural (L/R) audio captured by microphones 804 and 805 is transmitted by link 814 back to remote room 802 for use by speakers 809 and 810. Video display screen 811 may display the received video in either 2D or 3D. However, in accordance with the principles of the present invention, and in accordance with the fourth illustrative embodiment thereof, the binaural audio played by speakers

809 and 810 will be advantageously generated in accordance with the principles of the present invention based, inter alia, on the location of the human speaker on video display screen 811, as well as on the physical location of remote participant 812 in remote room 802 (i.e., on the location of remote participant 812 relative to video display screen 811).

Figure 9:
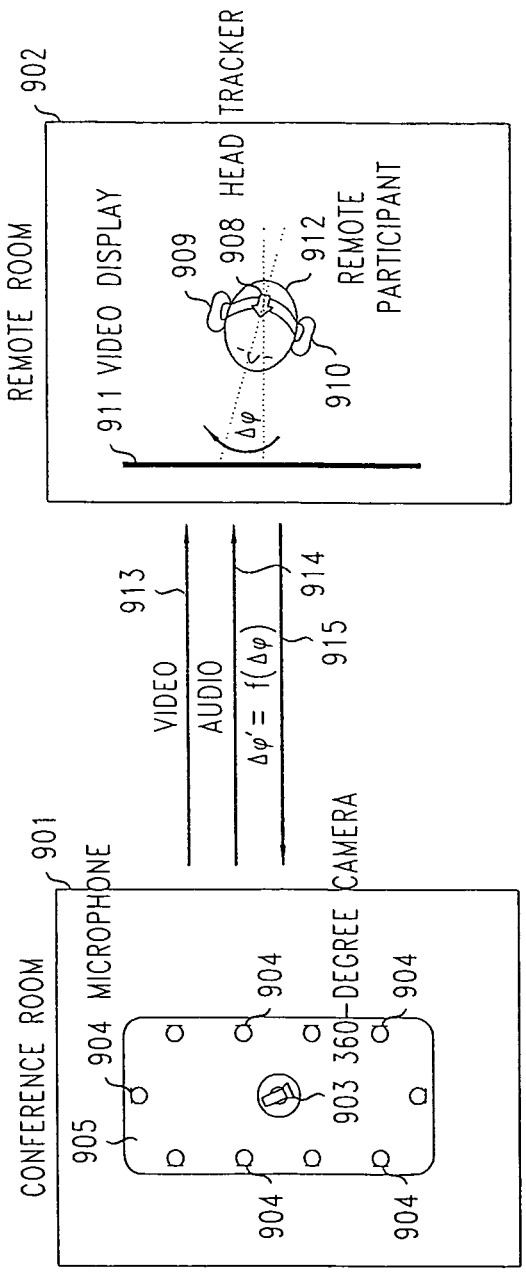
FIG. 9 shows an illustrative environment for providing binaural audio-visual rendering of a sound source in a video teleconferencing application using a video display screen and a 360 degree or partial angle video camera in the subject conference room, in accordance with a fifth illustrative embodiment of the present invention.

FIG. 9 shows an illustrative environment for providing binaural audio-visual rendering of a sound source in a video teleconferencing application using a video display screen and a 360 degree or partial angle video camera in the subject conference room, in accordance with a fifth illustrative embodiment of the present invention. The figure shows two rooms—conference room 901 and remote room 902. Remote room 902 contains remote participant 912 who is viewing the activity (e.g., a set of conference participants) in conference room 901 using video display screen 911 and listening to the activity (e.g., one or more speaking conference participants) in conference room 901 using a headset comprising right speaker 909 and left speaker 910. The headset also advantageously comprises head tracker 908 for determining the positioning of the head of remote participant 912. (In accordance with alternative embodiments of the present invention, head tracker 908 may be independent of the headset, and may be connected to the person's head or alternatively may comprise an external device—i.e., one not connected to remote participant 912. Moreover, in accordance with other illustrative embodiments of the present invention, the headset containing speakers 909 and 910 may be replaced by a corresponding pair of loudspeakers positioned appropriately in remote room 902, in which case adaptive crosstalk cancellation may be advantageously employed to reduce or eliminate crosstalk between each of the loudspeakers and the non-corresponding ears of remote participant 812—see discussion of FIG. 10 below.)

Conference room 901 contains 360 degree camera 903 (or in accordance with other illustrative embodiments of the present invention, a partial angle video camera) which advantageously captures video representing at least a portion of the activity in conference room 901, as well as a plurality of microphones 904—preferably one for each conference participant distributed around conference room table 905—which advantageously capture the sound which is produced by conference participants in conference room 901.

In accordance with the principles of the present invention, and in accordance with one illustrative embodiment thereof as shown in FIG. 9, the head movements of remote participant 912 may be tracked with head tracker 908, and the resultant head movement data may be transmitted by link 915 from remote room 902 to conference room 901. There, this head movement data may be provided to camera 903 such that the captured video image (based, for example, on the angle that the camera lens is pointing) properly mimics the head movements of remote participant 912 in accordance with an appropriate angle conversion function $f(\Delta\phi)$ as shown on link 915. (The function "f" will depend on the physical characteristics of camera 903 and conference room table 905 in conference room 901, and will be easily ascertainable by one of ordinary skill in the art. Illustratively, the function "f" may simply be the identity function, i.e., $f(\Delta\phi)=\Delta\phi$, or it may simply scale the angle, i.e., $f(\Delta\phi)=q\Delta\phi$, where q is a fraction.)

In accordance with one illustrative embodiment of the present invention, camera 903 may be a full 360 degree camera and the entire 360 degree video may be advantageously transmitted via link 913 to remote room 902. In this case, the video displayed on the video screen may comprise video extracted from or based on the entire 360 degree video, as well as on the head movements of remote participant 912 (tracked with head tracker 908). In accordance with this illustrative embodiment of the present invention, transmission of the head movement data to conference room 901 across link 915 need not be performed. In accordance with another illustrative embodiment of the present invention, camera 903 may be either a full 360 degree camera or a partial view camera, and based on the head movement data received over link 915, a particular limited portion of video from conference room 901 is extracted and transmitted via link 913 to remote room 902. Note that the latter described illustrative embodiment of the present invention will advantageously enable a substantial reduction of the data rate employed in the transmission of the video across link 913.

In accordance with either of these above-described illustrative embodiments of the present invention as shown in FIG. 9, the video captured in conference room 901 by camera 903 (or a portion thereof) is transmitted by link 913 back to remote room 902 for display on video display screen 911, and multi-channel audio captured by microphones 904 is transmitted by link 914 back to remote room 902 to be advantageously processed and rendered in accordance with the principles of the present invention for speakers 909 and 910. Video display screen 911 may display the received video in either 2D or 3D. However, in accordance with the principles of the present invention, and in accordance with the fifth illustrative embodiment thereof, the binaural audio played by speakers 909 and 910 will be advantageously generated in accordance with the principles of the present invention based, inter alia, on the location of the human speaker on video display screen 911, as well as on the physical location of remote participant 912 in remote room 902 (i.e., on the location of remote participant 912 relative to video display screen 911).

Figure 10:
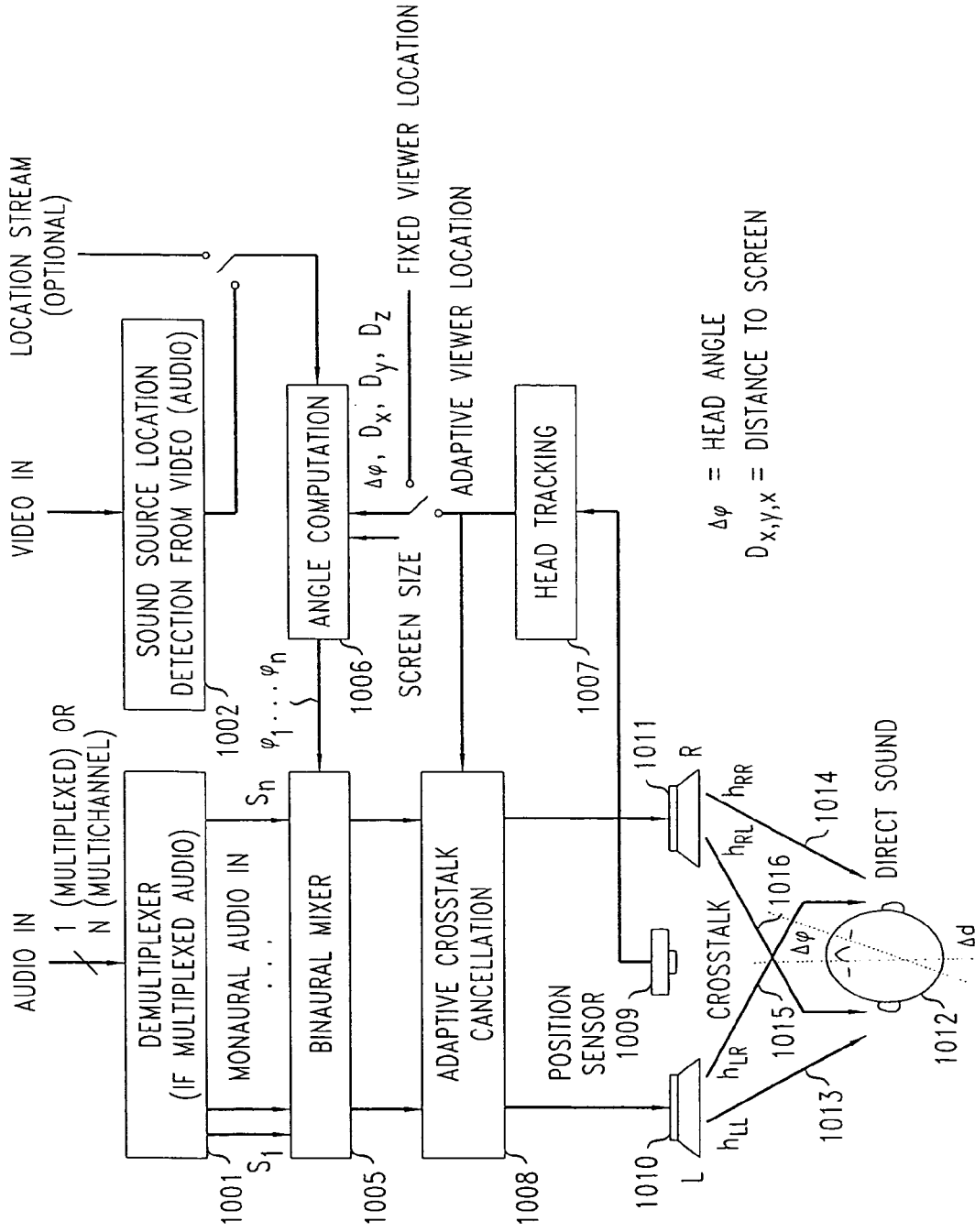
FIG. 10 shows a block diagram of an illustrative system for providing binaural audio-visual rendering of a sound source in a video teleconferencing application using head tracking and adaptive crosstalk cancellation, in accordance with a sixth illustrative embodiment of the present invention.

FIG. 10 shows a block diagram of an illustrative system for providing binaural audio-visual rendering of a sound source in a video teleconferencing application using head tracking and adaptive crosstalk cancellation, in accordance with a sixth illustrative embodiment of the present invention. The figure shows a plurality of audio channels being received by (optional) demultiplexer 1001, which is advantageously included in the illustrative system if the plurality of audio channels are provided as a (single) multiplexed signal, in which case demultiplexer 1001 generates a plurality of monaural audio signals (illustratively $s_1$ through $s_n$), which feed into binaural mixer 1005. (Otherwise, a plurality of multi-channel audio signals feed directly into binaural mixer 1005.)

Moreover, either a video input signal is received by (optional) sound source location detector 1002, which determines the appropriate locations in the corresponding video where given sound sources (e.g., the locations in the video of the various possible human speakers) are to be located, or, alternatively, such location information (i.e., of where in the corresponding video the given sound sources are located) is received directly (e.g., as meta-data). In either case, such sound source location information is advantageously provided to angle computation module 1006.

In addition, as shown in the figure, angle computation module 1006 advantageously receives viewer location data which provides information regarding the physical location of viewer 1012 ($D_x$, $D_y$, $D_z$)—in particular, with respect to the known location of the video display screen being viewed (which is not shown in the figure), as well as the tilt angle ($\Delta\phi$), if any, of the viewer's head. In accordance with one illustrative embodiment of the present invention, the viewer's location may be fixed (i.e., the viewer does not move in relation to the display screen), in which case this fixed location information is provided to angle computation module 1006. In accordance with another illustrative embodiment of the present invention, the viewer's location may be determined with use of (optional) head tracking module 1007, which, as shown in the figure, is provided position information for the viewer with use of position sensor 1009. As pointed out above in the discussion of FIGS. 8 and 9, head tracking may be advantageously performed with use of a head tracker physically attached to the viewer's head (or to a set of headphones or other head-mounted device), or, it may be performed with an external device which uses any one of a number of possible techniques—many of which will be familiar to those skilled in the art—to locate the position of the viewer's head. Position sensor 1009 may be implemented in any of these possible ways, each of which will be fully familiar to those skilled in the art.

In any case, based on both the sound source location information and on the viewer location information, as well as on the knowledge of the screen size of the given video display screen being used, angle computation module 1006, using the principles of the present invention and in accordance with an illustrative embodiment thereof, advantageously generates the desired angle information (illustratively $\phi_1$ thorough $\phi_n$) for each one of the corresponding plurality of monaural audio signals (illustratively, $s_1$ through $s_n$) and provides this desired angle information to binaural mixer 1005. Binaural mixer 1005 then generates a pair of stereo binaural audio signals, in accordance with the principles of the present invention and in accordance with an illustrative embodiment thereof, which will advantageously provide improved matching of auditory space to visual space. In accordance with one illustrative embodiment of the present invention, viewer 1012 uses headphones (not shown in the figure as representing a different illustrative embodiment of the present invention) which comprises a pair of speakers (a left ear speaker and a right ear speaker) to which these two stereo binaural audio signals are respectively and directly provided.

Figure 11:
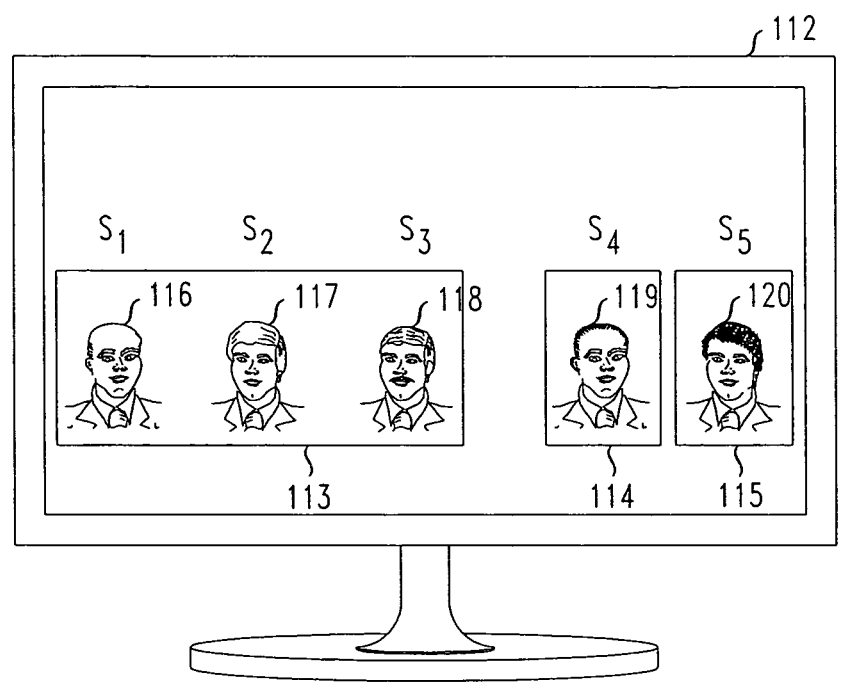
FIG. 11 shows an illustrative window-based video display which may be employed in accordance with an illustrative embodiment of the present invention.

In accordance with the illustrative embodiment of the present invention as shown in FIG. 10, however, the two stereo binaural audio signals are provided to adaptive crosstalk cancellation module 1008, which generates a pair of loudspeaker audio signals for left loudspeaker 1010 and right loudspeaker 1011, respectively. These loudspeaker audio signals are advantageously generated by adaptive crosstalk cancellation module 1008 from the stereo binaural audio signals supplied by binaural mixer 1005 based upon the physical viewer location (as either known to be fixed or as determined by head tracking module 1007). Specifically, the generated loudspeaker audio signals will advantageously produce: (a) from left loudspeaker 1010, left ear direct sound 1013 ($h_{LL}$), which has been advantageously modified by adaptive crosstalk cancellation module 1008 to reduce or eliminate right-speaker-to-left-ear crosstalk 1016 ($h_{RL}$) generated by right loudspeaker 1011, and (b) from right loudspeaker 1011, right ear direct sound 1014 ($h_{RR}$), which has been advantageously modified by adaptive crosstalk cancellation module 1008 to reduce or eliminate left-speaker-to-right-ear crosstalk 1015 ($h_{LR}$) generated by left loudspeaker 1010. Such adaptive crosstalk cancellation techniques are conventional and fully familiar to those of ordinary skill in the art.
Additional Disclosure, not Included in the Co-Pending Etter Application FIG. 11 shows an illustrative window-based video display which may be employed in accordance with an illustrative embodiment of the present invention. In particular, the figure shows window-based video display 112, which is displaying to a remote video teleconference participant (who is not shown in the figure) a video which comprises images of various other video teleconference participants (who are participating in the given video teleconference). Specifically, three separate windows are being displayed on window-based video display 112 as part of the video image—window 113, which contains a video or images of other video teleconference participant 116 ($S_1$), other video teleconference participant 117 ($S_2$) and other video teleconference participant 118 ($S_3$); window 114, which contains video or an image of other video teleconference participant 119 ($S_4$); and window 115, which contains video or an image of other video teleconference participant 120 ($S_5$).

Note that, in accordance with various illustrative embodiments of the present invention, the illustrative window-based display may show videos (i.e., moving images), still images, or a combination of both. In accordance with an illustrative embodiment of the present invention in which still images are shown, an audio signal comprising continuous sound (e.g., speech from another video teleconference participant whose still image is displayed) may nonetheless be advantageously associated with the given window even though the image as shown is static.

Figure 12:
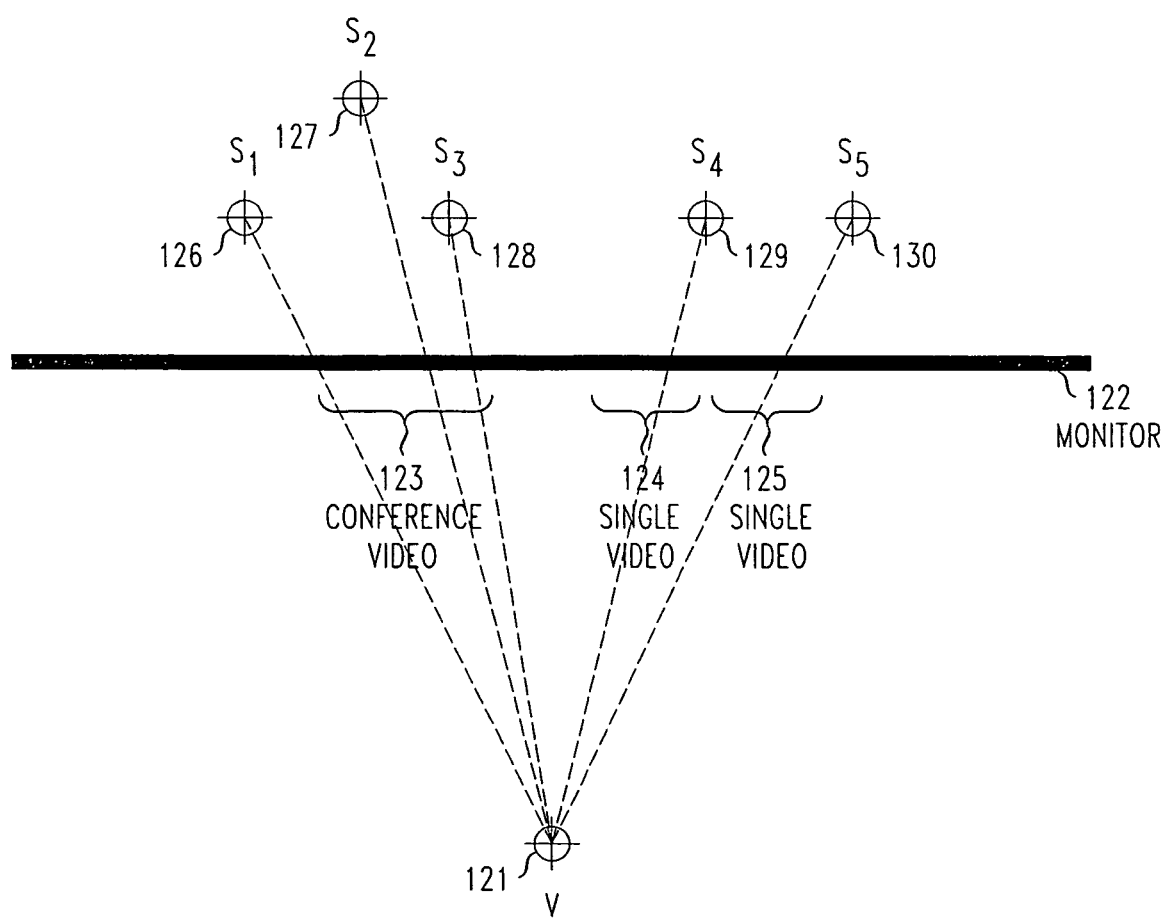
FIG. 12 shows an illustrative environment for providing audio-visual rendering of a sound source in a video teleconferencing application employing the illustrative window-based video display of FIG. 11, in accordance with a seventh illustrative embodiment of the present invention.

FIG. 12 shows an illustrative environment for providing audio-visual rendering of a sound source in a video teleconferencing application employing the illustrative window-based video display of FIG. 11, in accordance with a seventh illustrative embodiment of the present invention. The figure shows the location of remote video teleconference participant 121 (V) who is watching the video being displayed on monitor 122, which is, in accordance with the principles of the present invention, a window-based video display. In particular, and corresponding to the video image shown being displayed in FIG. 11 and described above, monitor 122 is displaying three separate windows—one displaying conference video 123, one displaying single video 124, and one displaying single video 125.

Moreover, in accordance with the seventh illustrative embodiment of the present invention, the figure shows five sound source locations which advantageously corresponding to the five other video teleconference participants that are shown in FIG. 11 and described above, wherein each of these sound source locations represents a corresponding desired physical location (relative to the location of monitor 122) for spatially rendering audio sound associated with the given other video teleconference participant. Specifically, sound source location 126 ($S_1$) is shown as the illustrative desired location for rendering audio sound associated with other video teleconference participant 116, who is displayed in the window displaying conference video 123; sound source location 127 ($S_2$) is shown as the illustrative desired location for rendering audio sound associated with other video teleconference participant 117, who also is displayed in the window displaying conference video 123; sound source location 128 ($S_3$) is shown as the illustrative desired location for rendering audio sound associated with other video teleconference participant 118, who also is displayed in the window displaying conference video 123; sound source location 129 ($S_4$) is shown as the illustrative desired location for rendering audio sound associated with other video teleconference participant 119, who is displayed in the window displaying single video 124; and sound source location 130 ($S_1$) is shown as the illustrative desired location for rendering audio sound associated with other video teleconference participant 120, who is displayed in the window displaying conference video 125.

Note that, in accordance with the illustrative embodiment of the present invention as shown in FIG. 12, each desired sound source location is advantageously based not only on the position on monitor 122 where the particular window (which contains the corresponding other video teleconference participant) is being displayed, but also on the position within the particular window where the other video teleconference participant is being displayed. (Note sound source locations 126, 127 and 128 for rendering audio sound associated with other video teleconference participants 118, 119 and 120, respectively, each of which is displayed at a different position in the window displaying conference video 123.) In accordance with other illustrative embodiments of the present invention, however, a desired sound source location may be based on the position on a monitor where the particular window (which contains the corresponding other video teleconference participant) is being displayed but not based on any particular position within the particular window.

And, in accordance with still other illustrative embodiments of the present invention, a desired sound source location may be further based on a physical location of the remote video conference participant who is viewing the video, relative to the physical location of the video display screen. (See, for example, the detailed discussion above with reference to FIGS. 4-10.)

Figure 13:
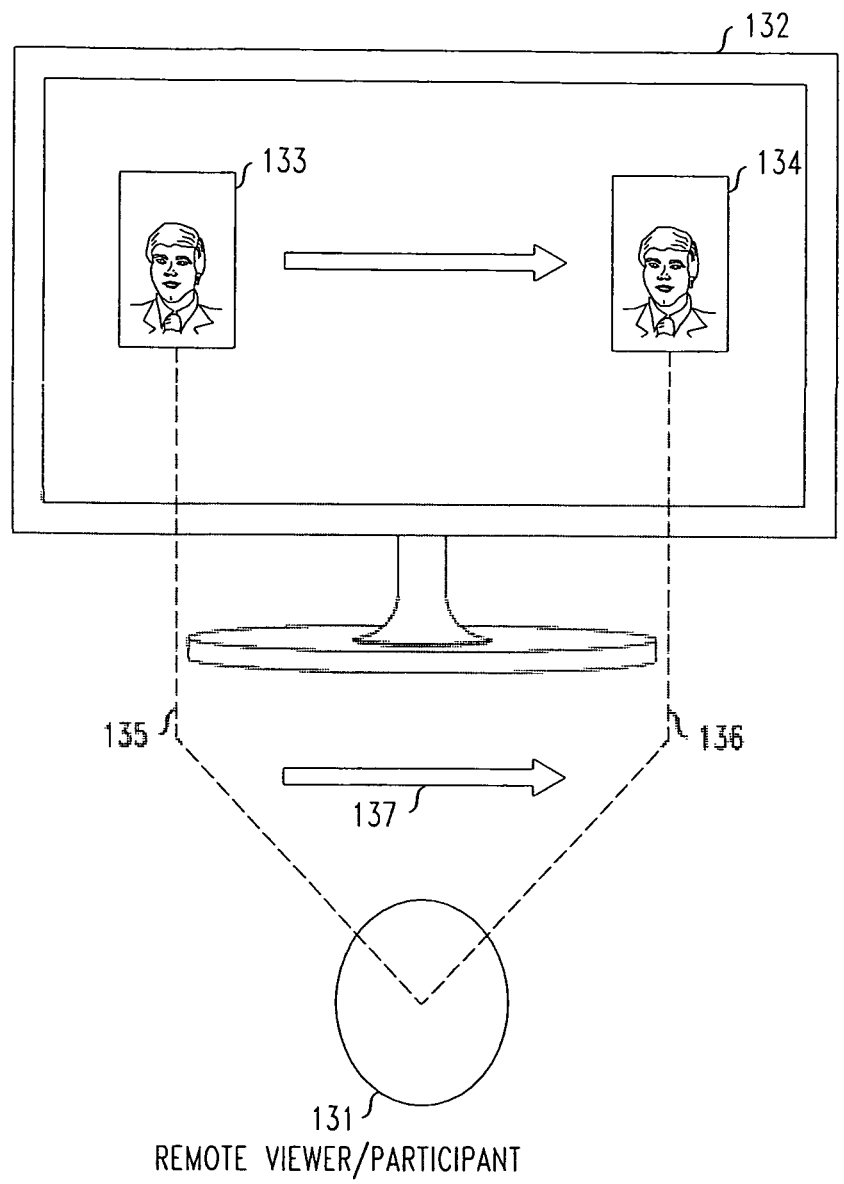
FIG. 13 shows an illustrative environment for providing audio-visual rendering of a sound source in a video teleconferencing application employing a window-based video display, wherein a given window position is relocated within the video display, in accordance with an eighth illustrative embodiment of the present invention.

FIG. 13 shows an illustrative environment for providing audio-visual rendering of a sound source in a video teleconferencing application employing a window-based video display, wherein a given window position is relocated within the video display, in accordance with an eighth illustrative embodiment of the present invention. The figure shows remote viewer/participant 131 (i.e., the remote video teleconference participant) viewing a video displayed on the video display screen of monitor 132. The video being displayed initially comprises window 133, illustratively located on the left side of the video display screen and which contains some other video teleconference participant. However, as a result of, for example, a directive from either the remote video teleconference participant (e.g., with use of a computer mouse or other control device), or from the illustrative teleconferencing system itself, the contents of window 133 is moved to the location of window 134, illustratively located on the right side of the video display screen. In accordance with the eighth illustrative embodiment of the present invention, the apparent sound source (as it is heard by remote viewer/participant 131) is correspondingly and advantageously relocated (as is shown by arrow 137 in the figure) from the left side of the video display screen (as shown by dotted line 135 in the figure) to the right side of the video display screen (as shown by dotted line 136 in the figure), such that the sound source location continues to correspond to the location of the window with which the audio sound is associated.

In accordance with certain illustrative embodiments of the present invention, the apparent sound source location may be advantageously adjusted continuously as the window moves "across" the video display screen from its "initial" position (e.g., on the left side of the screen) to its "final" position (e.g., on the right side of the screen), such that the sound source location advantageously moves gradually along with the movement of the window. For example, in accordance with one illustrative embodiment of the present invention, window 133 may be moved by remote viewer/participant 131 using a computer mouse. While window 133 is being moved (ultimately into window 134), the coordinates of the window continually change. These coordinates may, for example, be advantageously read by the associated computer operating system in small time intervals (e.g., every 50 milliseconds) in order to continually update the sound source location. For example, window coordinates may be advantageously translated into a sound source angle for the viewer, and in accordance with the principles of the present invention, based on the sound source angle, the sound may be advantageously rendered such that the visual and auditory locations match. Illustratively, in the relocation of window 133 to window 134 as shown in FIG. 13, tens of different sound source locations may be advantageously rendered, depending, for example, on the angle change for the viewer and the speed with which the window is moved.

Figure 14:
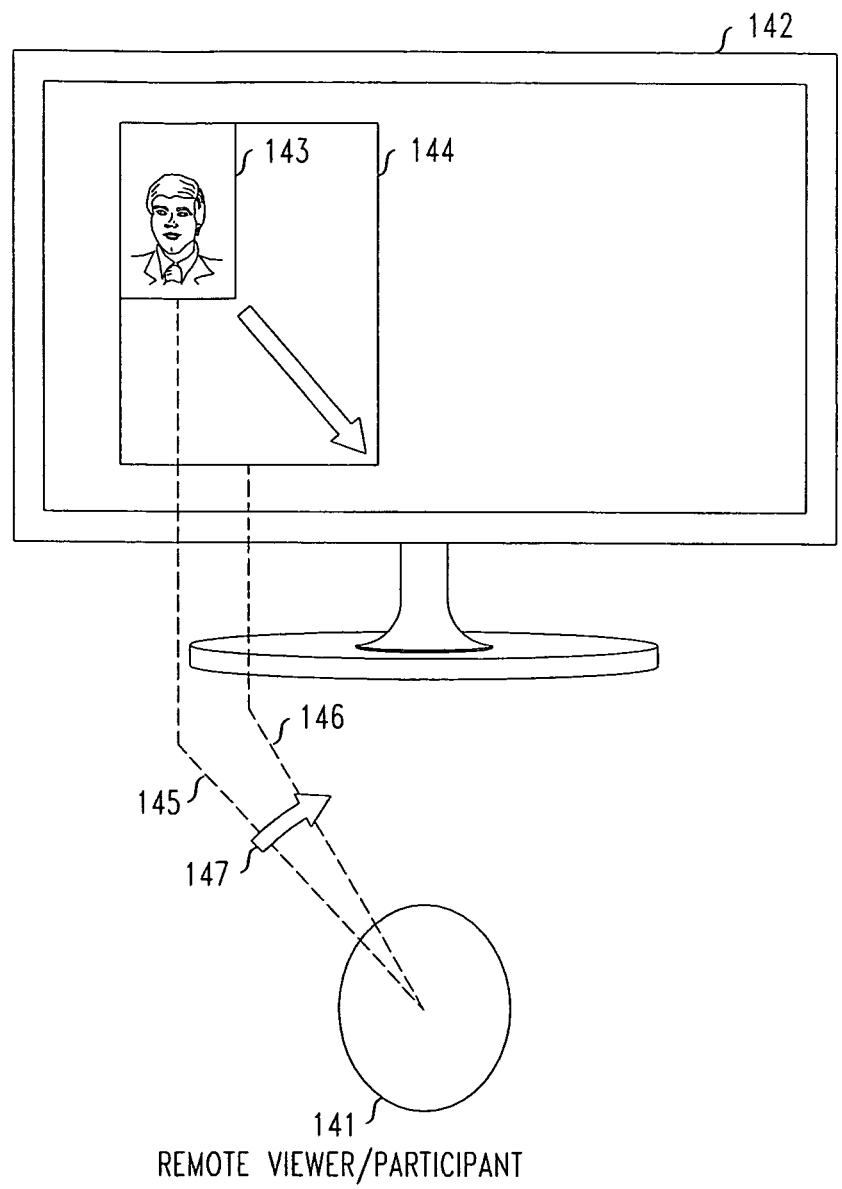
FIG. 14 shows an illustrative environment for providing audio-visual rendering of a sound source in a video teleconferencing application employing a window-based video display, wherein a given window position is resized within the video display, in accordance with a ninth illustrative embodiment of the present invention.

FIG. 14 shows an illustrative environment for providing audio-visual rendering of a sound source in a video teleconferencing application employing a window-based video display, wherein a given window position is resized within the video display, in accordance with a ninth illustrative embodiment of the present invention. The figure shows remote viewer/participant 141 (i.e., the remote video teleconference participant) viewing a video displayed on the video display screen of monitor 142. The video being displayed initially comprises window 143, illustratively of the size as shown on the video display screen in the figure and which contains some other video teleconference participant. However, as a result of, for example, a directive from either the remote video teleconference participant (e.g., with use of a computer mouse or other control device), or from the illustrative teleconferencing system itself, the contents of window 143 is resized into window 144, which illustratively is of a significantly larger size on the video display screen than is window 143. In accordance with the eighth illustrative embodiment of the present invention, the apparent sound source (as it is heard by remote viewer/participant 141) is correspondingly and advantageously relocated (as is shown by arrow 147 in the figure) from the position of window 143 (as shown by dotted line 145 in the figure) to the position of window 144 (as shown by dotted line 146 in the figure), such that the sound source location continues to correspond to the location of the window with which the audio sound is associated. Note that in accordance with certain illustrative embodiments of the present invention, although it is not explicitly shown in the figure, the vertical position of the sound source location may also be advantageously relocated (along with the horizontal position, as shown) in order to correspond to the location of the window with which the audio sound is associated.

In accordance with certain illustrative embodiments of the present invention, the volume of the audio sound and/or the apparent depth behind the video display screen of the audio sound source (i.e., the distance of the location of the apparent sound source from the axis of the video display screen) may be advantageously adjusted based on the size of the window associated with the audio sound. For example, when the size of a given window is increased, the volume of the audio sound associated therewith may also be advantageously increased, and when the size of a given window is decreased, the volume of the audio sound associated therewith may also be advantageously decreased. Similarly, when the size of a given window is increased, the apparent depth behind the video display screen of the audio sound source may be reduced (so that the sound appears "closer"), and when the size of a given window is decreased, the apparent depth behind the video display screen of the audio sound source may be increased (so that the sound appears "farther away"). In addition, in accordance with another illustrative embodiment of the present invention, when an illustrative teleconferencing system identifies that a given other video teleconference participant, being displayed in a particular one of the windows, is currently speaking, the particular window in which that video teleconference participant is being displayed may be advantageously enlarged.

In accordance with various illustrative embodiments of the present invention, volume adjustment based on the size of the window (as described above) may be implemented in a variety of ways which will be clear to one of ordinary skill in the art. For example, in accordance with one illustrative embodiment of the present invention, an audio signal x(t) corresponding to a given window may be amplified or attenuated using a gain, G, such that the resulting audio signal will become y(t)=G·x(t). The gain may, for example, be written as a function of the window height, h, such as, for example, $$G(h) = \left(\frac{h}{h_0}\right)^\theta,$$

where $h_0$ denotes a "default" window height, and θ the compander coefficient. For example, if we set θ=1, increasing the window height by a factor of two will increase the volume level of x(t) by 6 dB. Alternatively, a more moderate change may be desirable and may be effectuated by using, for example, θ=0.5, in which case an increase of the window height by a factor of two will only result in a volume level increase of 3 dB. It may also be desirable to limit the maximum and minimum gain (i.e., by setting a maximum and minimum value therefor), such that the amplification or attenuation advantageously stays within pre-defined bounds.

Addendum to the Detailed Description

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

A person of ordinary skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods.

The functions of any elements shown in the figures, including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A method for generating a spatial rendering of a real-time audio sound from a conference participant to a remote real-time video teleconference participant in real-time using a plurality of speakers, the audio sound related a real time to video being displayed to said remote video teleconference participant on a window-based video display screen having a given physical location of said conference participant, the method comprising:

receiving one or more real-time video input signals of said conference participant for use in displaying said real-time video to said remote video teleconference participant on said window-based video display screen, each of said received video input signals being displayed in a corresponding window on said video display screen;

receiving one or more real-time audio input signals related to said one or more video input signals, one of said audio input signals including said audio sound;

determining a desired physical location of said conference participant for spatially rendering said audio sound relative to said video display screen, the desired physical location being determined based on a position on the video display screen at which a particular one of said windows is being displayed, the particular one of said windows corresponding to the received video input signal related to the received audio input signal which includes said audio sound; and generating a plurality of real-time audio output signals based on said determined desired physical location for spatially rendering said audio sound, said plurality of audio signals being generated such that when delivered to said remote video teleconference participant using said plurality of speakers, the remote video teleconference participant hears said audio sound as being rendered from said determined desired physical location for spatially rendering said audio sound.

2. The method of claim 1 wherein said remote video teleconference participant and the video display screen are located in a remote room, and wherein the one or more video input signals and the one or more audio input signals are received in said remote room from one or more separate rooms each having one or more other video teleconference participants located therein.

3. The method of claim 2 wherein the plurality of audio output signals is generated further based on a position on the video screen within said particular one of said windows where a given other one of said video teleconference participants is being displayed.

4. The method of claim 2 further comprising enlarging a display size of the particular one of said windows corresponding to the received video input signal related to the received audio input signal which includes said audio sound, when it is determined that said audio sound comprises a given other one of said video teleconference participants who is currently speaking.

5. The method of claim 1 further comprising:
relocating, to a new position on the video display screen, the particular one of said windows corresponding to the received video input signal related to the received audio input signal which includes said audio sound;
determining a new desired physical location relative to said video display screen for spatially rendering said audio sound, the new desired physical location being determined based on the new position on the video display screen at which the particular one of said windows has been relocated; and
generating a new plurality of audio output signals based on said determined new desired physical location for spatially rendering said audio sound, said new plurality of audio signals being generated such that when delivered to said remote video teleconference participant using said plurality of speakers, the remote video teleconference participant hears said audio sound as being rendered from said determined new desired physical location for spatially rendering said audio sound.

6. The method of claim 1 wherein the desired physical location relative to said video display screen for spatially rendering said audio sound is further determined based on a display size of the particular one of said windows corresponding to the received video input signal related to the received audio input signal which includes said audio sound, the method further comprising:
resizing, to a new display size, the particular one of said windows corresponding to the received video input signal related to the received audio input signal which includes said audio sound;
determining a new desired physical location relative to said video display screen for spatially rendering said audio sound, the new desired physical location being determined based on the new display size of the particular one of said windows; and
generating a new plurality of audio output signals based on said determined new desired physical location for spatially rendering said audio sound, said new plurality of audio signals being generated such that when delivered to said remote video teleconference participant using said plurality of speakers, the remote video teleconference participant hears said audio sound as being rendered from said determined new desired physical location for spatially rendering said audio sound.

7. The method of claim 1 wherein the plurality of audio output signals is generated further based on a display size of the particular one of said windows corresponding to the received video input signal related to the received audio input signal which includes said audio sound, such that a volume level thereof is adjusted based on said display size of the particular one of said windows.

8. The method of claim 1 wherein the desired physical location relative to said video display screen for spatially rendering said audio sound is determined further based on a display size of the particular one of said windows corresponding to the received video input signal related to the received audio input signal which includes said audio sound, such that an apparent depth of said desired physical location relative to said video display screen for spatially rendering said audio sound is adjusted based on said display size of the particular one of said windows.

9. The method of claim 1 further comprising determining a current physical location of the remote video teleconference participant relative to said video display screen, and wherein the plurality of audio output signals is generated further based on said determined current physical location of the remote video teleconference participant relative to said video display screen.

10. The method of claim 1 wherein the plurality of speakers comprises a headphone set worn by the video conference participant, wherein the headphone set comprises at least a left speaker for providing sound to a left ear of the video conference participant and a right speaker for providing sound to a right ear of the video conference participant, and wherein said generating the plurality of audio output signals comprises generating binaural audio signals comprising at least a left audio output signal which is used to drive the left speaker and a right audio output signal which is used to drive the right speaker.

11. The method of claim 1 wherein the plurality of speakers comprises a plurality of loudspeakers placed in predetermined physical locations relative to the given physical location of the video display screen, wherein the plurality of loudspeakers includes at least a left loudspeaker whose predetermined physical location comprises a position left of the video display screen and a right loudspeaker whose predetermined physical location comprises a position right of the video display screen, and wherein said generating the plurality of audio output signals comprises generating binaural audio signals comprising at least a left audio output signal which is used to drive the left loudspeaker and a right audio output signal which is used to drive the right loudspeaker.

12. The method of claim 11 wherein the left audio output signal has been adapted to reduce crosstalk from the right loudspeaker to a left ear of the video conference participant, and wherein the right audio output signal has been adapted to reduce crosstalk from the left loudspeaker to a right ear of the video conference participant.

13. An apparatus for generating a spatial rendering of a real-time audio sound from a conference participant to a remote video teleconference participant in real-time, the apparatus comprising:
a plurality of speakers;
a real-time window-based video display screen having a given physical location of said conference participant, the window-based video display screen for displaying a real-time video to the video teleconference participant, the real-time audio sound being related to the video being displayed to said video teleconference participant;
a video input signal receiver which receives one or more real-time video input signals of said conference participant for use in displaying said video to said remote video teleconference participant on said window-based video display screen, each of said received video input signals being displayed in a corresponding window on said video display screen;

an audio input signal receiver which receives one or more real-time audio input signals related to said one or more video input signals, one of said received audio input signals including said audio sound;

a processor which determines a desired physical location of said conference participant for spatially rendering said audio sound relative to said video display screen, the desired physical location being determined based on a position on the video display screen at which a particular one of said windows is being displayed, the particular one of said windows corresponding to the received video input signal related to the received audio input signal which includes said audio sound; and an audio output signal generator which generates a plurality of real-time audio output signals based on said determined desired physical location for spatially rendering said audio sound, said plurality of audio signals being generated such that when delivered to said remote video teleconference participant using said plurality of speakers, the remote video teleconference participant hears said audio sound as being rendered from said determined desired physical location for spatially rendering said audio sound.

14. The apparatus of claim 1 wherein said apparatus comprises a portion of a video teleconferencing system located in a remote room, and wherein the one or more video input signals and the one or more audio input signals are received by said apparatus from one or more separate rooms each having one or more other video teleconference participants located therein.

15. The apparatus of claim 14 wherein the audio output signal generator generates said plurality of audio output signals further based on a position on the video screen within said particular one of said windows where a given other one of said video teleconference participants is being displayed.

16. The apparatus of claim 14 wherein said processor further directs said video display screen to enlarge a display size of the particular one of said windows corresponding to the received video input signal related to the received audio input signal which includes said audio sound, when it is determined that said audio sound comprises a given other one of said video teleconference participants who is currently speaking.

17. The apparatus of claim 13 wherein the processor
further directs said video display screen to relocate, to a new position on the video display screen, the particular one of said windows corresponding to the received video input signal related to the received audio input signal which includes said audio sound, and
further determines a new desired physical location relative to said video display screen for spatially rendering said audio sound, the new desired physical location being determined based on the new position on the video display screen at which the particular one of said windows has been relocated, and also
wherein said audio output signal generator further generates a new plurality of audio output signals based on said determined new desired physical location for spatially rendering said audio sound, said new plurality of audio signals being generated such that when delivered to said remote video teleconference participant using said plurality of speakers, the remote video teleconference participant hears said audio sound as being rendered from said determined new desired physical location for spatially rendering said audio sound.

18. The apparatus of claim 13 wherein the processor determines said desired physical location relative to said video display screen for spatially rendering said audio sound further based on a display size of the particular one of said windows corresponding to the received video input signal related to the received audio input signal which includes said audio sound, and wherein the processor
further directs said video display screen to resize, to a new display size, the particular one of said windows corresponding to the received video input signal related to the received audio input signal which includes said audio sound, and
further determines a new desired physical location relative to said video display screen for spatially rendering said audio sound, the new desired physical location being determined based on the new display size of the particular one of said windows, and also
wherein said audio output signal generator further generates a new plurality of audio output signals based on said determined new desired physical location for spatially rendering said audio sound, said new plurality of audio signals being generated such that when delivered to said remote video teleconference participant using said plurality of speakers, the remote video teleconference participant hears said audio sound as being rendered from said determined new desired physical location for spatially rendering said audio sound.

19. The apparatus of claim 13 wherein the audio output signal generator generates said plurality of audio output signals further based on a display size of the particular one of said windows corresponding to the received video input signal related to the received audio input signal which includes said audio sound, such that a volume level thereof is adjusted based on said display size of the particular one of said windows.

20. The apparatus of claim 13 wherein the processor determines said desired physical location relative to said video display screen for spatially rendering said audio sound further based on a display size of the particular one of said windows corresponding to the received video input signal related to the received audio input signal which includes said audio sound, such that an apparent depth of said desired physical location relative to said video display screen for spatially rendering said audio sound is adjusted based on said display size of the particular one of said windows.

21. The apparatus of claim 13 wherein the processor further determines a current physical location of the remote video teleconference participant relative to said video display screen, and wherein the audio output signal generator generates said plurality of audio output signals further based on said determined current physical location of the remote video teleconference participant relative to said video display screen.

22. The apparatus of claim 13 wherein the plurality of speakers comprises a headphone set worn by the video conference participant, wherein the headphone set comprises at least a left speaker for providing sound to a left ear of the video conference participant and a right speaker for providing sound to a right ear of the video conference participant, and wherein said audio output signal generator generates the plurality of audio output signals by generating binaural audio signals comprising at least a left audio output signal which is used to drive the left speaker and a right audio output signal which is used to drive the right speaker.

23. The apparatus of claim 13 wherein the plurality of speakers comprises a plurality of loudspeakers placed in predetermined physical locations relative to the given physical location of the video display screen, wherein the plurality of loudspeakers includes at least a left loudspeaker whose predetermined physical location comprises a position left of the video display screen and a right loudspeaker whose predetermined physical location comprises a position right of the video display screen, and wherein said audio output signal generator generates the plurality of audio output signals by generating binaural audio signals comprising at least a left audio output signal which is used to drive the left loudspeaker and a right audio output signal which is used to drive the right loudspeaker.

24. The apparatus of claim 23 wherein the left audio output signal has been adapted to reduce crosstalk from the right loudspeaker to a left ear of the video conference participant, and wherein the right audio output signal has been adapted to reduce crosstalk from the left loudspeaker to a right ear of the video conference participant.

* * * * *